KUHN & NAX.
Tobacco Pipe.
No. 43,416.
Patented July 5, 1864.
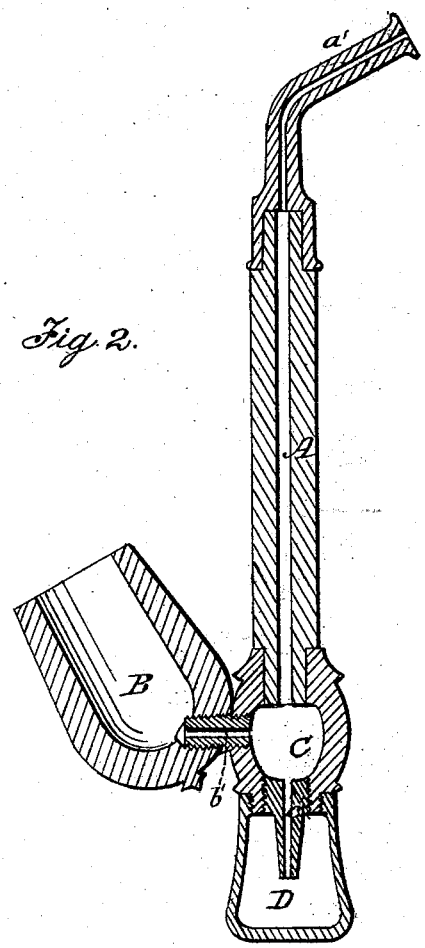
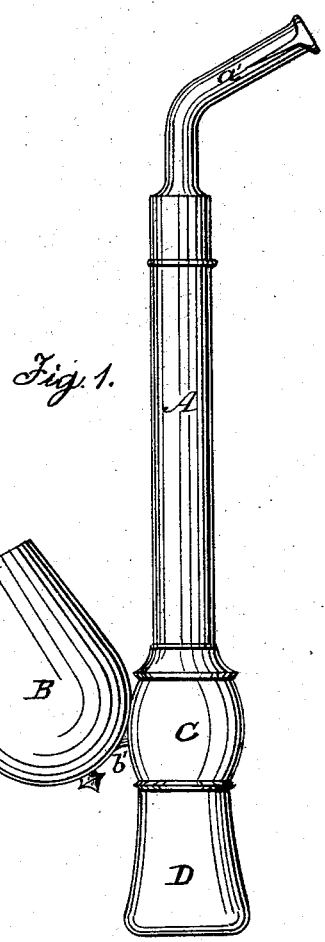
Fig. 2.
Fig. 1.
Witnesses:
Inventor
Alfred Kühn
Leonard Nax.

United States Patent Office.

ALBERT KÜHN AND LEONARD NAX, OF PHILADELPHIA, PENNSYLVANIA.

IMPROVEMENT IN TOBACCO-PIPES.

Specification forming part of Letters Patent No. 42,416, dated July 5, 1864.

*To all whom it may concern:*

Be it known that we, ALBERT KÜHN and LEONARD NAX, of the city of Philadelphia, in the State of Pennsylvania, have invented a new and useful Improvement in Tobacco-Pipes; and we do hereby declare that the following is a full, clear, and exact description of the construction and operation of the same, reference being had to the accompanying drawings, making a part of this specification, in which—

Figure 1 is a perspective view, and Fig. 2 a longitudinal central section, of the said improved pipe, like letters of reference indicating the same parts when in both figures.

The object of our invention is the production of a tobacco-pipe that will more effectually prevent the access of nicotine to the mouth-tube and of saliva to the bowl when in use, and also prevent the reflux of saliva and nicotine into the smoke-tube when the pipe is held either in a horizontal or an inverted position.

It consists in the peculiar arrangement, hereinafter described and specified, of a capacious chamber between the bowl and the smoke-stem, in combination with a readily-removable saliva and nicotine receptacle directly beneath the said chamber and communicating therewith by means of a short inclosed tube.

In the drawings, A is the smoke-stem; and $a'$ the mouth-tube, B the bowl, C the capacious chamber, and D the receptacle for the fluids.

In the present instance the stem and the bowl are made of wood, the mouth-tube, chamber, and receptacle of horn, and the mouth-tube, stem, and chamber-piece permanently secured together.

The bowl B is attached in an inclined position, so as to communicate with the chamber C by means of a short hollow horizontal stem, $b'$, which screws into both, as seen in Fig. 2, so that the bowl can be easily detached, as occasion may require, in cleaning the pipe.

The chamber C has a diameter nearly as large as that of the bowl B, and communicates at its upper end directly with the stem A, and at one side with the bowl B, through the short stem $b'$, and also at its lower end, by means of another short stem, $c'$, with the receptacle D.

The receptacle D is a cup, which is made to screw onto the lower end of the chamber-piece, and receives within it the free lower end of the hollow stem $c'$, which projects vertically downward from the chamber C', as seen in Fig. 2. All the joints fit together so as to be air-tight.

It will be readily understood that when this pipe is in use the smoke, vapor, and nicotine drawn from the bowl will first enter the chamber C through the short horizontal tube $b'$, where its heavier or objectionable portions will be inclined to settle toward the bottom of the chamber and eventually to pass down through the tube $c'$ into the receptacle D, and that any saliva which may enter the mouth-tube $a'$ will flow down freely into the chamber C, and thence directly into the receptacle D, and consequently the tobacco in the bowl B will always be kept free from saliva. It will also be seen, as the stem $c'$ projects vertically downward into the receptacle, that when the pipe is placed either in a horizontal or an inverted position the contents of the receptacle D cannot reflow into the chamber C, and that when necessary the said receptacle can be easily detached and emptied. The receptacle D also affords a very convenient means of holding the pipe in hand.

Having thus fully described our improvement, what we claim as new therein of our invention, and desire to secure by Letters Patent, is—

The arrangement of the chamber C between the bowl B and stem A, in combination with the receptacle D and the inclosed stem $c'$, substantially as described and set forth, for the purposes specified.

ALBERT KÜHN.
LEONARD NAX.

Witnesses:
BENJ. MORISON,
JAMES P. DIC.